(12) United States Patent
Pitz et al.

(10) Patent No.: US 12,422,816 B2
(45) Date of Patent: Sep. 23, 2025

(54) METHOD FOR OPERATING A NUMERICALLY CONTROLLED PRODUCTION MACHINE, AND CORRESPONDING NUMERICAL CONTROL

(71) Applicant: Siemens Aktiengesellschaft, Munich (DE)

(72) Inventors: Thomas Pitz, Rutesheim (DE); Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 17/431,078

(22) PCT Filed: Feb. 6, 2020

(86) PCT No.: PCT/EP2020/052974
§ 371 (c)(1),
(2) Date: Aug. 13, 2021

(87) PCT Pub. No.: WO2020/165016
PCT Pub. Date: Aug. 20, 2020

(65) Prior Publication Data
US 2022/0137587 A1    May 5, 2022

(30) Foreign Application Priority Data
Feb. 15, 2019  (EP) .................................... 19157411

(51) Int. Cl.
*G05B 19/404*     (2006.01)
(52) U.S. Cl.
CPC .. *G05B 19/404* (2013.01); *G05B 2219/31104* (2013.01); *G05B 2219/37428* (2013.01);
(Continued)

(58) Field of Classification Search
CPC ........ G05B 19/404; G05B 2219/31104; G05B 2219/37428; G05B 2219/42344;
(Continued)

(56) References Cited

U.S. PATENT DOCUMENTS 5,832,188 A    11/1998  Papiernik
6,704,875 B1 *  3/2004  Kinoshita ............ G05B 19/042
                                                         713/300
(Continued)

FOREIGN PATENT DOCUMENTS

CN        1478010 A      2/2004
CN      101715572 A      5/2010
(Continued)

OTHER PUBLICATIONS

PCT International Search Report and Written Opinion of International Searching Authority malled May 19, 2020 corresponding to PCT International Application No. PCT/EP2020/052974 filed Jun. 2, 2020.
(Continued)

*Primary Examiner* — Tameem D Siddiquee
(74) *Attorney, Agent, or Firm* — Henry M. Feiereisen LLC

(57) ABSTRACT

A method for operating a numerically controlled production machine includes defining a permissible value range determined by the design and construction of the production machine in which, in a normal operation during production of a workpiece, values representing a mechanical or electrical load described by acceleration and/or jolting of at least one component of the numerically controlled production machine are variable, and activating, for producing the workpiece, with a control signal a conservation operation for reducing the mechanical or electrical loads, wherein in the conservation operation the values of acceleration and/or
(Continued)

jolting of the at least one component are variable within a part value range that is limited in comparison to the permissible value range.

14 Claims, 1 Drawing Sheet

(52) U.S. Cl.
CPC .............. *G05B 2219/42344* (2013.01); *G05B 2219/49057* (2013.01); *G05B 2219/49073* (2013.01)

(58) Field of Classification Search
CPC ........... G05B 2219/49057; G05B 2219/49073; G05B 2219/43058; G05B 2219/43065; G05B 19/4065; Y02P 90/02
See application file for complete search history.

(56) References Cited

U.S. PATENT DOCUMENTS

| | | | |
|---|---|---|---|
| 2004/0051197 A1 | 3/2004 | Bald | |
| 2006/0287758 A1* | 12/2006 | Geissdorfer | G05B 19/41 |
| | | | 700/186 |
| 2007/0027582 A1 | 2/2007 | Munnix | |
| 2008/0275574 A1* | 11/2008 | Testa | G05B 19/404 |
| | | | 700/29 |
| 2009/0009126 A1* | 1/2009 | Hishikawa | B22D 17/32 |
| | | | 318/600 |
| 2012/0093603 A1 | 4/2012 | Ueno | |
| 2013/0041497 A1 | 2/2013 | Schon et al. | |
| 2016/0124416 A1 | 5/2016 | Besuchet et al. | |
| 2017/0269571 A1* | 9/2017 | Pitz | G05B 19/21 |
| 2018/0126509 A1 | 5/2018 | Pereira | |
| 2019/0146459 A1* | 5/2019 | Nakajima | G05B 19/4186 |
| | | | 700/28 |

FOREIGN PATENT DOCUMENTS

| | | |
|---|---|---|
| CN | 102859315 A | 1/2013 |
| DE | 10 2007 084 191 A1 | 1/2009 |
| EP | 0788587 A1 | 4/1997 |
| EP | 1 628 883 B1 | 8/2008 |
| EP | 1969323 A2 | 8/2008 |
| EP | 2623271 A1 | 8/2013 |
| EP | 3015929 A1 | 5/2016 |
| FR | 2978932 A1 | 2/2013 |
| GB | 2532096 A | 5/2016 |
| WO | WO 9612992 A1 | 5/1986 |
| WO | WO 2013143686 A1 | 10/2013 |

OTHER PUBLICATIONS

Xu Liang Yuan et al:; "The Research of the Law of Acceleration and Deceleration which the Acceleration is Variable in Succession"; Engineering College,Anhui Agricultural University ,Hefei230036 ; 2. School of Mechanical and Automobile Engineering ,Hefei University of Technology, Hefei230009,China; DOI:1001-2265 (2005) 03-0012-02;.

* cited by examiner

METHOD FOR OPERATING A NUMERICALLY CONTROLLED PRODUCTION MACHINE, AND CORRESPONDING NUMERICAL CONTROL

CROSS-REFERENCES TO RELATED APPLICATIONS

This application is the U.S. National Stage of International Application No. PCT/EP2020/052974, filed Feb. 6, 2020, which designated the United States and has been published as International Publication No. WO 2020/165016 A1 and which claims the priority of European Patent Application, Serial No. 19157411.0, filed Feb. 15, 2019, pursuant to 35 U.S.C. 119 (a)-(d).

BACKGROUND OF THE INVENTION

The invention relates to a method for operating a numerically controlled production machine having at least one component that during the procedure of producing a workpiece is subjected to mechanical and/or electrical loads that are described by values of acceleration and/or jolting of the at least one component, wherein the values are variable in a normal operation within a permissible value range, wherein the permissible value range is determined by the design and construction of the production machine, wherein so as to produce the workpiece a conservation operation for reducing the mechanical and/or electrical loads is activated in a manner triggered by at least one control signal.

The invention likewise relates to a numerical controller for a production machine, said numerical controller being adapted so as to perform the method for the operation.

Numerically controlled production machines such as machine tools or industrial robots are used for the production of workpieces. When production machines are used, it is relevant inter alia how much time is involved in the manufacture of a workpiece. The shorter the time for processing a workpiece, the more efficient is the manufacturing or production process. Optimization methods are available for shortening the processing time.

Producers of machine tools or industrial robots compete with one another using slogans such as for example "accuracy and speed in the production" as to who offers the quickest or most accurate machine. The more accurately and/or more quickly a machine tool or an industrial robot can manufacture a workpiece, the more attractive is this production machine for the user. Accordingly, the movable components of the production machine are constructed and designed for high mechanical loads, in particular for high dynamic loads—in order to identify the movement of the machine elements within the space the term "machine axis" is used. This goes to the limits of the material load, which has a massive impact on the service life or at least on the frequency of the maintenance intervals. The load limits result from the most varied types of loads on the machine elements. In the case of an axis mechanism that is embodied from steel, as for example a ball screw spindle, the guides and roller or sliding shoes wear out quickly in the case of fast and frequent movements and consequently have to be serviced or replaced frequently. Also electrical components that are designed for ever faster and more frequent movement procedures (braking and acceleration procedures) and furthermore that are also always designed to be as small as possible (due to purchasing costs, waste heat and space requirements, etc.) reach their thermal limits. Electrical components include, for example, feed-in components by way of which the group of drives of the production machine are connected to the electrical supply network and said electrical components also include motor modules with which the drive motors of the production machine are controlled. They are even operated at these limits for a longer period of time.

In principle, many production procedures can be stopped and started at any arbitrary point in time. However, there are also production procedures in which the quality of the workpiece and/or of the processing procedure or similar are adversely affected if the production procedure is stopped or started arbitrarily. This mainly has to do with the temperature behavior of the production machines or of the workpiece. A specific example is for example that material deforms as a result of the temperature if cooling water is no longer flowing through the working chamber of a fully automatic milling machine, if the electrical components of the axes are not energized and in the absence of the movement there is no longer any friction. Although the metal deforms or distorts only slightly, for example by a few millimeters, the geometry or the accuracy of the axes is however impaired or severely changed. As a result of this distortion, the processing accuracy possibly no longer meets the requirements of the workpiece, A production machine can often then only maintain the specified processing accuracy if said production machine is at operating temperature, in other words if it always moves if cooling water is always flowing through the working chamber, etc. Such a machine tool is booted up at the start of a production procedure for a few minutes or possibly up to multiple hours so that it can achieve its operating temperature and thus achieve its processing accuracy. Only then are workpieces processed or produced. Or what is even more costly: workpieces are produced that are less accurate until the desired workpiece quality and workpiece accuracy are realized. The workpieces that are produced with less accuracy are then disposed of.

It is also possible that specific manufacturing techniques or types of processing procedures are unable to tolerate the production process being arbitrarily started, stopped or also interrupted. One example of this is the procedure of milling a toothed wheel, where multiple machine axes that are coupled to one another move the workpiece and the tool one inside the other in such a manner that it is not possible to stop this production procedure. The tool and the workpiece would be destroyed. A further example of a manufacturing technique that cannot tolerate being interrupted is a laser processing procedure in which the tool is a laser beam that must first be brought into a specific operating state over a longer period of time so that it can perform the procedure. The procedure of producing for example large aircraft components by means of a tape laying machine or fiber placement machine using tempered materials (adhesive strips, etc.) and tempered workpieces or workpiece molds likewise does not allow arbitrary changes during the course of the manufacturing process.

Production machines currently have the operating states 'ON' or 'OFF'. In the 'ON' state, the production machines are operated up to the limits of the permissible mechanical and/or electrical load. If the production process or the production procedure allow, said production machines are switched to the 'OFF' state so that it is no longer possible to perform axis movements. However, as a result of conserving the machine by switching it off, a longer run-up phase can be required, as described above. It is often not possible in the case of specific processes or techniques for the production machines to operate more slowly, since in typical movement instructions (NC parts program, etc.), the positions and the speeds of the movement are predetermined. It is often not expedient to reduce the speeds for example using the override switch or by making changes to the NC parts program, the reason being that specific processes on the machine tool are governed by the processing speed. There is for example a specific cutting speed that is to be realized for a material pairing (workpiece-material and cutting material). If the cutting speed is not maintained, this results in manufacturing problems in the form of a poorer surface quality or increased wear on the tool.

EP 3 015 929 A1 discloses an operating method for a machine tool, wherein in dependence upon external control signals components of the machine tool can be activated and deactivated as required. A user input and signals from a timer are named as external signals. The object of EP 3 015 929 A1 is to keep the components of the machine tool in a specific temperature range.

GB 2 532 096 A discloses an operating method for a machine tool, wherein with the aid of intended operating parameters an anticipated energy requirement of the machine tool is determined. If the anticipated energy requirement exceeds a predetermined upper limit, operating parameters of the machine tool are changed by a superordinate controller in such a manner that the anticipated energy requirement drops below the predetermined upper limit.

FR 2 978 932 A discloses an operating method for a drilling machine, wherein a temperature that occurs in the drill and/or the drilling force required for the drilling procedure is ascertained and in dependence thereon the rotational speed of the drill and the forward thrust speed of the drill are adjusted. The object of approach disclosed in FR 2 978 932 A is to reduce the wear.

The object of the invention is to propose a method for operating a numerically controlled production machine, with which whilst maintaining a consistent production quality the intervals for maintenance and/or replacement of machine components are extended. The invention is likewise based on the object of proposing a numerical controller that is embodied so as to perform the method.

SUMMARY OF THE INVENTION

The first object mentioned is achieved by means of a method as set forth hereinafter. It follows from this that the method mentioned in the Introduction for operating a numerically controlled production system is characterized in that in the conservation operation the values of acceleration and/or jolting of the at least one component are variable within a part value range, wherein the part value range is limited in comparison to the permissible value range.

The maximal permissible load is determined by the design and the construction, the permissible wear limits of the at least one component and/or their thermal load. The reduction of this maximal permissible load in a conservation operation thus means a reduced mechanical and/or thermal load and consequently reduced wear. The conservation operation is activated depending upon the loading of the production machine in a specific production process. In the conservation operation, the production machine continues to be operated. Problems arising from the production machine being at a standstill and then restarted consequently do not occur. In particular, the temperature of the working space also remains to a great extent constant and consequently also the accuracy of the production procedure. Run-up phases are not necessary. Depending upon the scenario, the demand-oriented specification of a part value range of the physical variables that characterize the loading, said part value range being limited in comparison to the permissible value range, can solve specific problems relating to machine wear experienced by customers and in use. The service life of the machine can be extended by permanently or also only intermittently operating the machine in the "comfortable range".

Advantageous embodiments of the method are disclosed by the features of dependent claims.

An advantageous embodiment of the method in accordance with the invention is characterized In that the movement of the at least one component occurs at least along an axis and that the movement variables include an axis acceleration. Since the axis acceleration in the conservation operation is still only variable in the limited part value range, the maximal value of the acceleration along the axis is thus reduced in comparison to the permissible specified axis acceleration. Axes whose acceleration has been reduced perform speed changes more slowly, as a result less mechanical load and thus less wear occurs in the electronic system and in the mechanics. Consequently, the large load on the axis mechanics and on the electric system as a result of acceleration and braking procedures is reduced so that the machine is preserved.

A particularly advantageous configuration of the method in accordance with the invention is characterized in that the production of the workplece comprises at least one first production step in which the component acts on the workpiece, that the production of the workpiece comprises at least a second production step in which the component does not act on the workplece, that in the conservation operation In the case of the at least one first production step the values of acceleration and/or jolting of the at least one component are variable within the permissible value range and that in the conservation operation in the case of at least one second production step the values of acceleration and/or jolting of the at least one component are variable only within the limited part value range.

Consequently, nothing changes in the technique or the actual processing or production process since all the processing variables that are to be achieved, for example the cutting speed, remain the same. The production quality of the workpiece is thus not impaired; it is merely the time between the individual processing or production steps, in other words the time required for the at least one second production step, that is increased. Consequently, in the case of a machine tool, for example maximal values relating to acceleration and/or jolting are only reduced if the processing part is not acting on the workpiece.

In accordance with a further advantageous configuration of the method, the at least one control signal is specified by a manual input on a user interface of the numerically controlled production machine. For example, the machine operator of the controller provides the information that during the night shift the operation occurred at only 50% of the maximal axis acceleration in all axes.

In accordance with an advantageous configuration of the method the at least one control signal is triggered in the event of a limit temperature of one component of the production machine being exceeded. For the conservation operation, it is thus possible to use for example the temperature of axes, motor modules or energy supplies for the motor modules as criteria for a reduction of the maximal values of acceleration of the relevant axis.

The second object mentioned is achieved by a numerical controller as set forth hereinafter. It follows from this that the production machine is embodied so as to perform the method claimed.

BRIEF DESCRIPTION OF THE DRAWING

The above-described characteristics, features and advantages of this invention and the manner in which these are realized are more clearly and more precisely understandable in conjunction with the following description of the exemplary embodiments that are further explained hi connection with the drawings. In these drawings in a schematic view.

DETAILED DESCRIPTION OF PREFERRED EMBODIMENTS

The following described exemplary embodiments of the invention relate to a numerically controlled production machine that is embodied as a numerically controlled machine tool. With relevant adjustments that are determined by the production technique and do not however affect the fundamental operating principle, the description also applies for an embodiment of the production machine as a manufacturing robot. It is a common aspect of these two embodiments of the production machine that in the case of the production or the processing of a workpiece numerically controlled relative movements occur between a processing part of the production machine and a workpiece.

Figure 1:
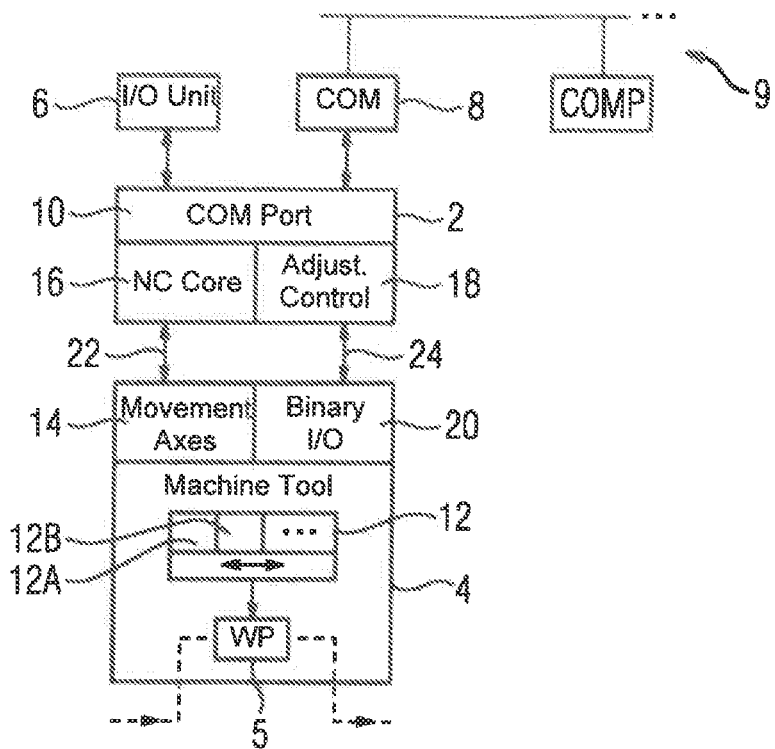
FIG. 1 shows the fundamental construction of a machine tool having a machine tool controller.

The schematic view in FIG. 1 illustrates a numerical machine tool controller 2 that cooperates with a machine tool 4 so as to produce or also process a workpiece 5. The tool machine 4 together with the connected and adapted machine tool controller 2 forms a numerically controlled production machine, A user or operator gains access to the machine tool controllers 2 by way of an input/output unit $ that is also described as a NC control panel. In addition, a communication interface 8 is also provided that renders it possible to embed the numerically controlled machine tool 4 in a computer network 9, this type of operation is described in English as a 'Distributed Numerical Control' (DNC).

The machine tool controller 2 is divided into three main function areas, A first main function area, the COM-part 10, fulfills communication tasks using a connected peripheral, such as for example the communication interface 8 and further input and output assemblies, sensors, end switches and similar. Furthermore, the COM part 10 enables communication with the input/output unit 6, in addition, it provides a programming environment that comprises at least one program editor, but often also simulation and test facilities.

The essential task of the machine tool 4 is to produce or manufacture and process the workpiece 5, wherein relative movements between a processing part 12 of the machine tool 4 and the workpiece 5 occur. The processing part 12 comprises in general a multiplicity of components 12A, 12B etc. that operate independently of one another or also cooperate with one another. Components 12A, 12B etc. also include movable components. The machine tool controller 2 generates for the movable components target values of the movements that are to be performed along one or multiple axes of movement axes 14 that by involving the drive components in the machine tool 4 realize a surface design or surface form corresponding to the manufacturing specifications. The second main functionality of the machine tool controllers 2 in other words a path control procedure and interpolation and consequently the generation of movement target values for the individual movement, axes 14 of the machine tool 4 is realized in a NC core 16.

Finally the third main functionality of the machine tool controller 2 is realized by an adjustment control 18 that serves to adjust the general movement control in relation to the workpiece 5 from the NC core 16 to suit the specific machine tool 4. This includes controlling the actuators, detecting sensor signals, realizing monitoring functions, ensuring functions related to safety etc. by way of binary input/output 20 of the machine tool 4. The adjustment control procedure 18 is performed by means of a PLC (programmable logic contoller), in other words using a it logic controller.

The data or signal-related connection of the machine tool controller 2 to the machine tool 4 is produced with regard to the movement target values for the axes 14 of the machine tool 4 by way of first control lines 22 and with regard to the actuators and sensors in the machine tool 4 by way of second control lines 24.

The machine tool 4 is specified for its special application purpose and for the different operating states and constructed and designed accordingly. The construction and design of the components of the machine tool 4 are determined in particular by the permissible mechanical load and in particular by the permissible dynamic load. These include the maximal rotational speed of a spindle, the maximal axis speed of the linear forward thrust along the axes 14, the maximal acceleration along the axes 14 and the maximal jolting on the axes 14. The same also applies for the jolting. The maximal values of the movement variables apply for a normal operation of the machine tool 4, in other words to a use and operation of the machine tool 4 according to the specification. The values of the movement variables lie in a normal operation always within a permissible value range LIMIT1 that is limited by the negative and positive permissible maximal values. They can be the same size for all axes 14 but they can also be different. In addition, they can be determined by specific states within and/or outside the machine tool 4, for example by the ambient temperature.

The permissible value ranges LIMIT1 are part of the machine specification. They are provided at the time of commissioning the numerical controller 2 together with the machine tool 4 of the controller 2, for example by way of setup files from the machine tool manufacturer and/or by way of the second control lines 24. In addition, input masks and input dialogues are also further possibilities for specifying the permissible value ranges LIMIT1. Consequently, the numerical controller 2 is parameterized with respect to the connected machine tool 4 by assigning the system variables provided for this with respect to the machine tool 4.

In addition to the above-described normal operation, the machine tool 4 can be operated with the permissible value ranges LIMIT1 in a conservation operation. In the conservation operation, a part value range LIMIT2 is activated that is limited in comparison with the permissible value range LIMIT1. The limitation can be performed by means of reduction factors, however it is also possible to use more complex reduction algorithms or reduction tables or reduction characteristic curves that take into consideration mutual dependencies of the physical variables. In principle; the conservation operation can be specified individually for each movement axis 14 of the machine tool 4.

Figure 2:
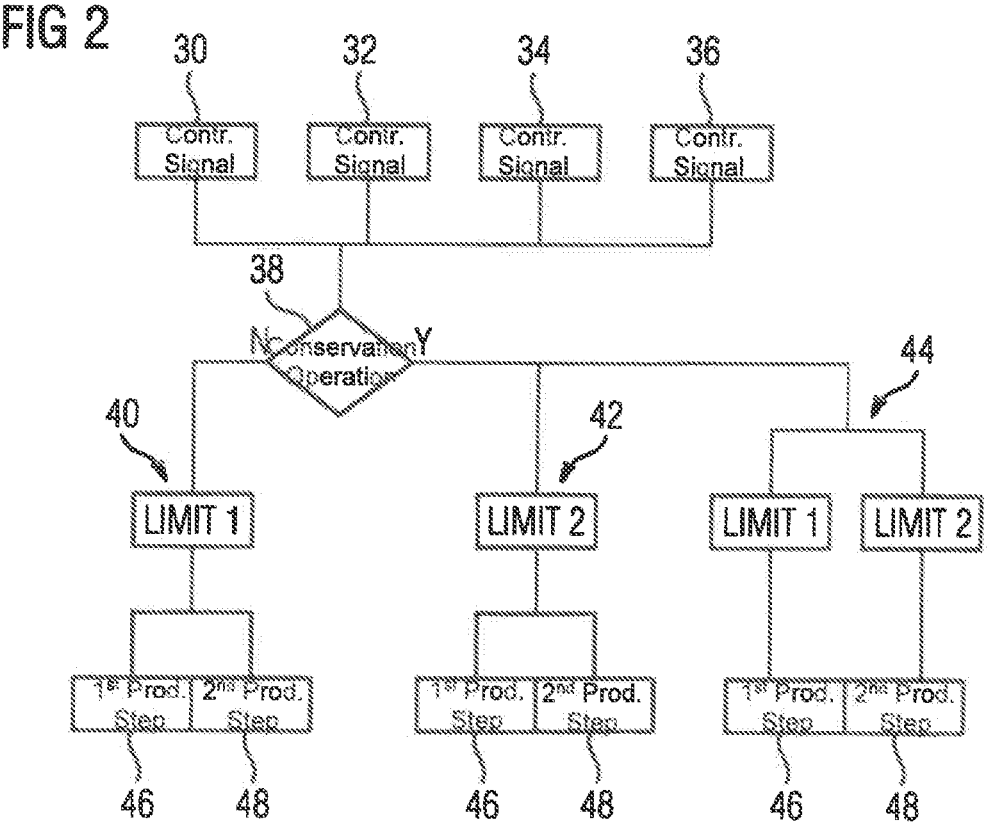
FIG. 2 shows a function diagram of the controller for activating a conservation operation.

FIG. 2 illustrates the activation of the conservation operation. For example, four different possibilities for specifying the normal operation are illustrated. Initially, a machine user can specify by means of a manual input 30 by way of the input/output unit 6 that the machine tool 4 is to be operated in a conservation operation. Alternatively, the conservation operation can be specified by means of a time control 32. For example, the machine tool 4 is to be operated in the normal operation during the day and in the conservation operation during the night. It is likewise possible to specify the conservation operation by way of a remote control unit 34. In the case of a reduced number of production orders for a specific time period in the conservation operation, a production manager can for example produce a reduced number of workpieces 5 and pass this information to the machine tool 4 by way of the computer network 9. It is likewise possible to activate the conservation operation by way of the state of components in the machine tool 4. By way of corresponding limit value notifications 36, for example if the temperature of the motor or of the power electronics is exceeded, the controller 2 switches into the conservation operation.

Whether the machine tool 4 is to be operated in the normal operation or in the conservation operation depends upon a corresponding control signal at one of the possible input sites 30, 32, 34, 36. This is clarified by a program branch 38. If a request to operate the machine tool 4 in the conservation operation has not been received, in FIG. 2 the result "N" of the program branch 38, the permissible value range LIMIT1 is adopted for all physical stress variables. The values of the physical variables can adopt each value within the permissible value range LIMIT1. They are determined by the specification of the machine tool 4. This normal operation is to be clarified by a first branch 40.

If a request for a conservation operation has been received, in FIG. 2 the result "Y" of the program branch 38, the part value range LIMIT2 is adopted at least for one production step. Consequently, the mechanical and/or electrical loads in this production step are reduced in comparison to the normal operation.

During a first implementation of the conservation operation, the part value range LIMIT2 is adopted both for a first production step 45, in which the processing part 12 or one of its components 12A, 12B etc. act on the workpiece 5, and also for a second production step 48 in which the processing part 12 or one of its components does not act on the workpiece 5. Included in the second production step 48 are procedures of changing the tool and movements between different processing procedures that do not continuously follow one another, for example drilling multiple identical holes one after the other. This first implementation type of the conservation operation is clarified by a second branch 42.

In dependence upon the production technique and demand for production quality, the conservation operation can also only be activated for the second production step 48 of the machine tool 4, during which the processing part 12 of the machine tool 4 does not act on the workpiece 5, this third implementation type of the conservation operation is clarified by a third branch 44.

A large portion of the mechanical stress on the movable components is caused by acceleration and braking procedures. In the case of a simple and yet very effective implementation type of the conservation operation, the maximal values of the acceleration and/or of the jolting, in other words the limits of the part value range LIMIT2 for all movement axes 14 reduces for all movement axes 14 for example to half the maximal values in the normal operation, in other words the limits of the permissible value range LIMIT1.

One possibility of specifying the second maximal values can be realized by means of a command in the control program, by means of which the machine operator is requested to input information. The request for information provides the machine operator with the possibility of activating the limited part value range LIMIT2. Consequently, the user is given access rights to variables, parameters and permissible value ranges that are specified at the time the controller is initialized together with the production machine as a permissible value range LIMIT1 by the production machine.

One or also multiple implementation types of the conservation operation can be stored as a conservation operation module in the machine tool controller 2, in a similar manner as in the case of the parameterization procedure during the procedure of commissioning the machine tool controller 2. The normal operation module can be configured in such a manner that the part value ranges LIMIT2 can be specified or changed by a machine operator interactively on the input/output unit 6.

What is claimed is:

1. A method for operating a numerically controlled production machine, comprising:
    defining a permissible value range determined by the design and construction of the production machine in which, in a normal operation during production of a workpiece, values representing a mechanical or electrical load described by acceleration and/or jolting of at least one component of the numerically controlled production machine are variable, and
    activating, for the production of the workpiece, with a control signal a conservation operation for reducing the mechanical or electrical loads, wherein In the conservation operation the values of acceleration and/or jolting of the at least one component are variable within a part value range that is limited in comparison to the permissible value range,
    wherein the production of the workpiece comprises at least one first production step, in which the at least one component acts on the workpiece and, in the conservation operation, the values of acceleration and/or jolting of the at least one component are variable within the permissible value range, and at least one second production step, in which the at least one component does not act on the workpiece and, in the conservation operation, the values of acceleration and/or jolting of the at least one component are variable only within the limited part value range.

2. The method of claim 1, wherein the at least one component moves at least along an axis and variables describing movement along at least the axis comprise an axis acceleration.

3. The method of claim 1, wherein the control signal is specified by a manual input at an input/output unit of the numerically controlled production machine.

4. The method of claim 1, wherein the control signal is triggered by a state of the at least one component of the production machine.

5. The method of claim 1, wherein the control signal is triggered when a limit temperature of at least one component of the production machine is exceeded.

6. The method of claim 1, wherein the control signal is triggered by remote control.

7. The method of claim 1, wherein the control signal is triggered in a time-controlled manner.

8. The method of claim 1, wherein the production machine is embedded in a computer network and the control signal is specified by a control computer that is connected to the computer network.

9. The method of claim 1, wherein the production machine is embodied as a machine tool.

10. The method of claim 1, wherein the production machine is embodied as a manufacturing robot.

11. A numerical controller for a production machine, said numerical controller being configured to perform the method of claim 1.

12. The method of claim 1, further comprising:
 detecting the control signal;
 operating the numerically controlled production machine in the normal mode when the control signal is not detected; and
 operating the numerically controlled production machine in the conservation operation, when the control signal is detected, in a first implementation of the conservation operation, wherein the values of the acceleration and/or the jolting of the at least one component are variable within the permissible value range in the at least one first production step and the values of acceleration and/or jolting of the at least one component are variable only within the limited part value range in the at least one second production step.

13. The method of claim 12, further comprising operating the numerically controlled production machine in a second implementation of the conservation operation, when the control signal is detected, wherein the values of the acceleration and/or the jolting of the at least one component are variable only within the limited part value range in the at least one first production step and the at least one second production step.

14. The method of claim 1, further comprising:
 providing the permissible value range at a time of commissioning of the numerically controlled production machine; and
 specifying and/or changing the limited part value range by an operator of the numerically controlled production machine.

* * * * *